Dec. 8, 1970          J. SALOMON          3,545,171
HEAT-SEALING APPARATUS
Filed Nov. 16, 1967          6 Sheets-Sheet 1
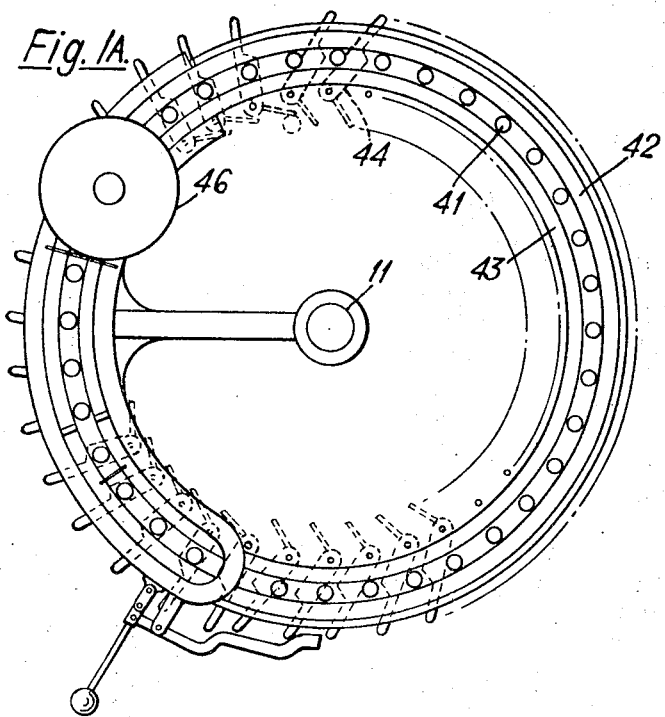
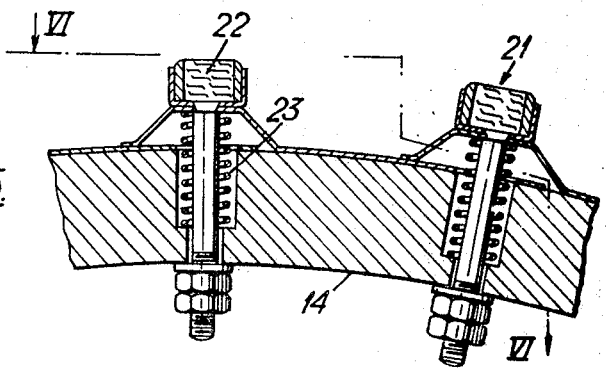
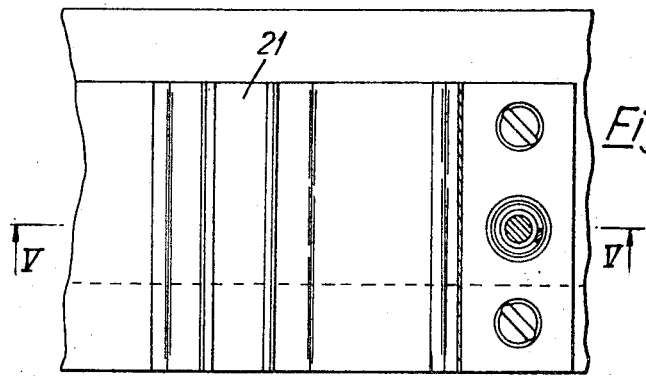
Inventor
Jacob Salomon
By
Cushman, Darby & Cushman
Attorneys

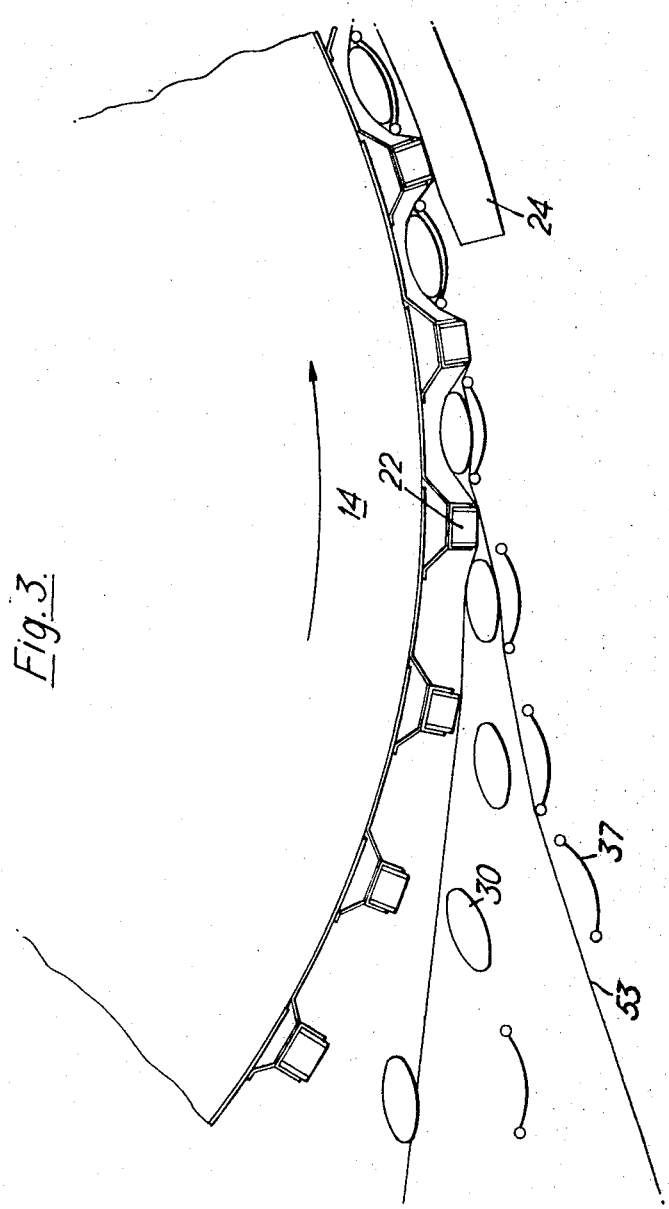

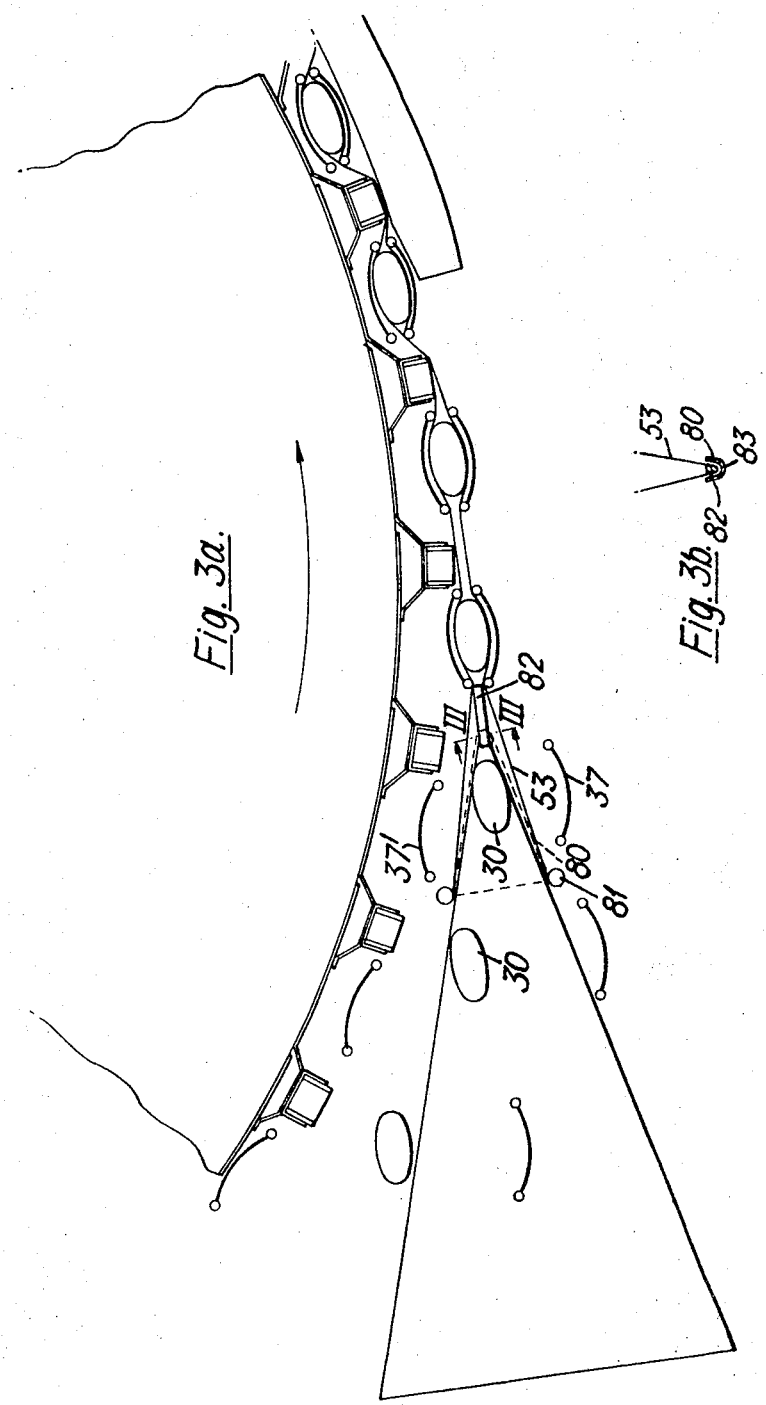

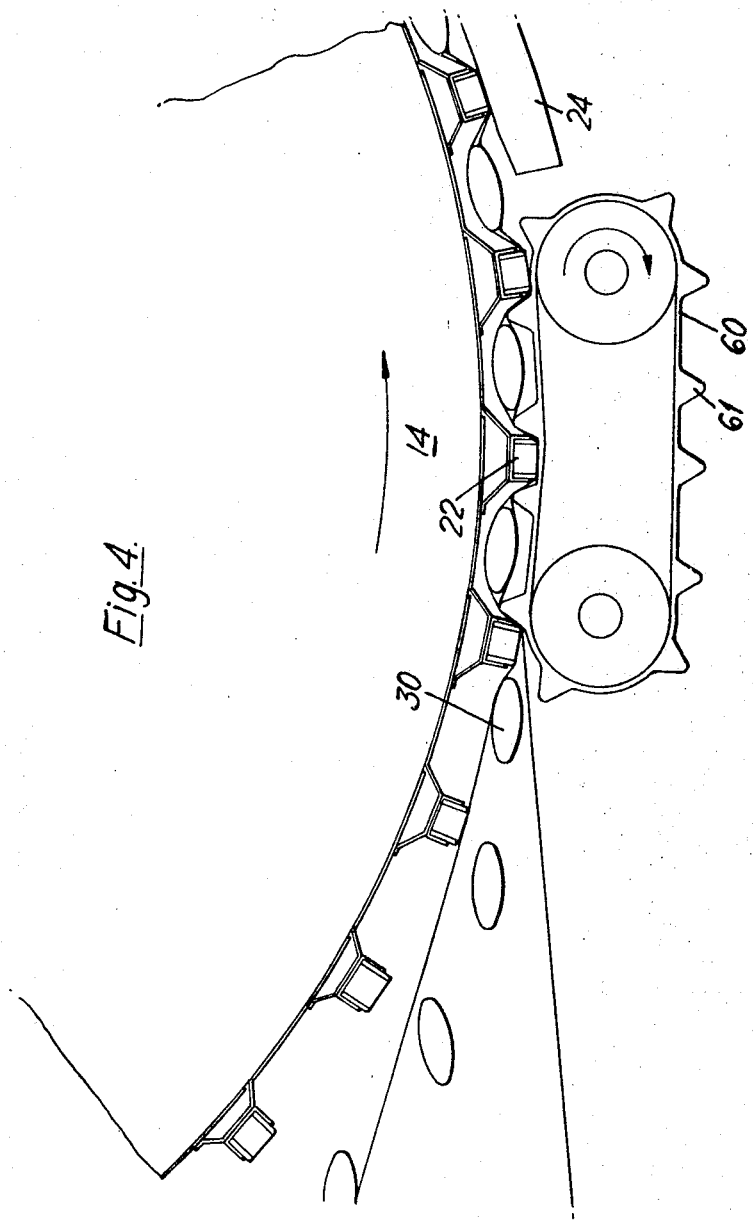

United States Patent Office 3,545,171
Patented Dec. 8, 1970

3,545,171
HEAT-SEALING APPARATUS
Jacob Salomon, 10 Weizman Square, Holon, Israel
Filed Nov. 16, 1967, Ser. No. 683,672
Int. Cl. B65b 9/12
U.S. Cl. 53—180                          11 Claims

ABSTRACT OF THE DISCLOSURE

A heat-sealing apparatus for sealing a web at spaced intervals, e.g. in the production of tea bags, in which a wheel has outward projections on its periphery and the web is fed between the projections and a heated member extending around some of the periphery. The web may be folded to form a channel prior to feeding, and funnels carried by the wheel may rotate with the wheel to feed tea into the channel as the latter passes against the heated member.

---

The present invention relates to a method and apparatus for heat-sealing a web of heat-sealable material.

The invention is particularly concerned with a method and apparatus for heat-sealing a web at spaced apart intervals, for example in the course of manufacture of sachets such as tea-bags or sugar bags and the like.

Conventional bag making machines, which operate on heat-sealable material, have a maximum operating speed of 70–100 bags per minute. This limit is governed by the time required to fill the bags as well as to seal the web between the bags. The sealing of the bag is effected by two heated rollers or jaws, which bear one in contact with each side of the bags along a line, so that the period during which the material is heated is short. After leaving the rollers or jaws the material is cooled by the air. If the speed of the machine is increased, then the material contained by the bag, such as tea or sugar, has a tendency to tear the seal lines acting like a wedge and penetrates into the seams before a complete cooling and setting of the material occurs.

It is an object of the present invention to provide an improved heat-sealing apparatus.

According to the present invention there is provided a heat-sealing apparatus comprising a rotatable wheel having a plurality of projecting elements extending radially outwardly from the periphery thereof, a heated arcuate member positioned to extend around a portion of the periphery of the wheel to overlie a plurality of said elements and means for feeding a web of material between said elements and said arcuate member.

As the web material is fed between the projecting elements and the heated member, it is heated and sealed at the positioning of said elements. Since the arcuate heating member is of a length to span a plurality of the elements, the bag material is welded over a prolonged period.

The means for feeding the web of material may include a folding arrangement adapted to fold the web into a V-formation, so that the web is effectively doubled on itself, to provide a channel into which tea leaves or other material may be fed.

In a preferred construction the heated arcuate member extends for approximately 120° of the circumference of the wheel which may be provided, for example, with 36 protruding elements providing 36 pockets therebetween. Preferably adjacent the heated arcuate element, on the downstream side thereof, there is provided an arcuate cooling element of similar construction, which again spans a plurality of pockets and may extend, for example, for a further 120° of the periphery of the wheel.

Advantageously, the wheel is provided with a funnel arrangement for each of the pockets formed between the radially extending elements. Each funnel construction is of a size such that the stem of the funnel, which is preferably elliptical in cross-section, can seat within a pocket of the wheel and can move round with the wheel between the periphery of the wheel and the arcuate heated and cooling member (where provided).

Each funnel may be supported on an arm which is pivoted to the wheel on an axis parallel to the wheel axis, the arm also being vertically reciprocable, the vertical reciprocation and radial positioning of the arm being effected by suitable cams.

With funnel arrangements as indicated above, each funnel can be brought into a position between the folded over web forming for example, a tea-bag strip, so that it provides a former for producing each individual bag in the pockets of the wheel. Preferably, means are provided for forcing the radially outer portion of the folded web against the funnel, as it enters the pockets formed between the projecting elements and maintaining the web in contact with the funnel as it passes the arcuate heated member, so that the only points of the web which are in contact with the heated member, are those points which overlie the projecting elements.

The means for forcing the web against the funnel may comprise a cam operated clamp associated with each of the pockets, or may comprise a conveyor or chain positioned immediately upstream of the point at which the web enters the pockets of the wheel, the chain or conveyor being provided with outwardly extending projections which engage the web to force it against the funnel. These means, however, would not support the web against the funnel as it passes the arcuate heated member.

Advantageously, the funnels are fed with tea or other material at a position approximately at the upstream end of the arcuate heated member. The supply of tea or other material may continue as the funnels travel round with the wheel, the funnels being raised steadily, so that they disengage from the web at a position approximately at the downstream end of the arcuate cooled member. Means may be provided downstream of the cooled member for taking up slack in the web and for sealing the open edges of the channel formed in the web.

The invention also provides a method of heat-sealing using the apparatus of the invention.

In order that the present invention may more readily be understood, the following description is given, merely by way of example, reference being made to the accompanying drawings, in which:

FIG. 1a is a top plan view of the upper plate of the apparatus of FIG. 1;

FIG. 3 is a schematic scrap section of the periphery of the wheel, showing the means for guiding the web into the pockets;

FIG. 3a is a view similar to FIG. 3 showing a modified form of said means;

FIG. 3b is a scrap section on the line 3—3 of FIG. 3a;

FIG. 4 is a view similar to FIG. 3 showing an alternative form of said means;

FIG. 5 is a scrap section of a portion of the periphery of the wheel taken along the line 5—5 of FIG. 6, illustrating the radially protruding element; and FIG. 6 is a section on the line 6—6 of FIG. 5.

Figure 2:
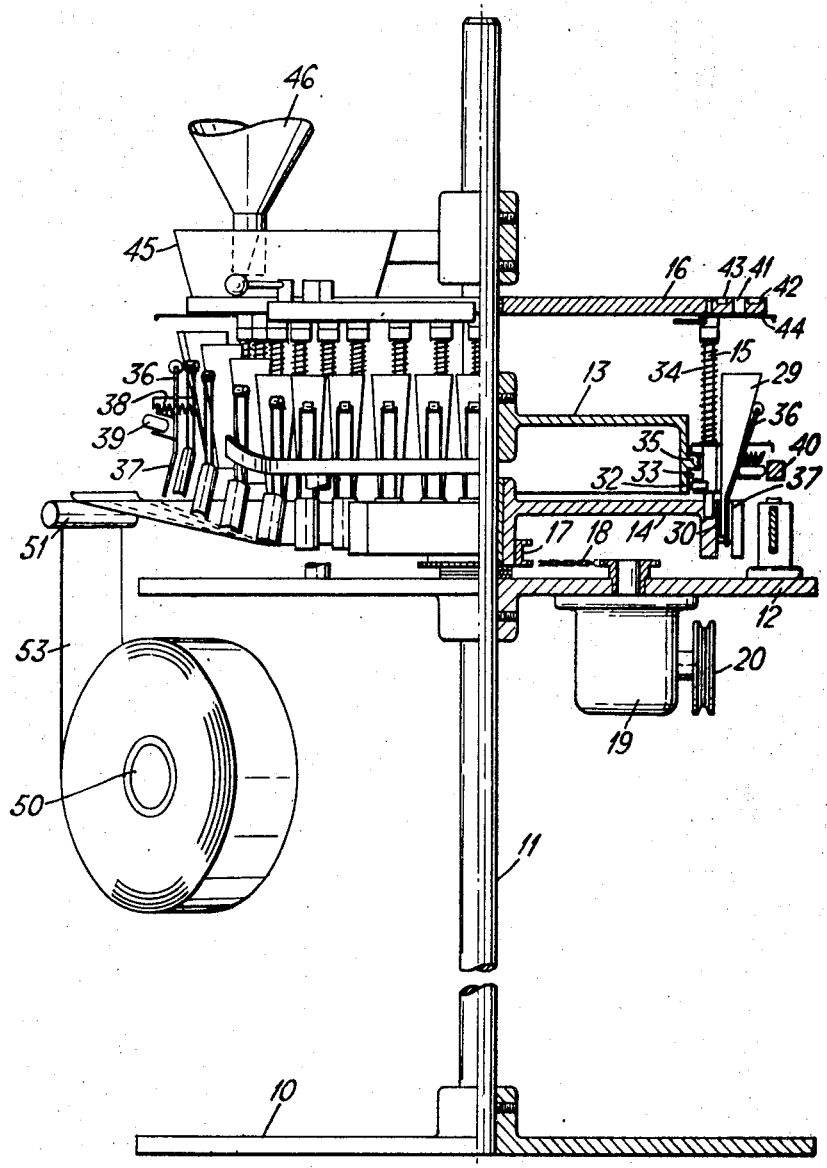
FIG. 2 is a front elevation of the apparatus of FIG. 1 shown partly in section.

Referring now to the drawings, there is illustrated a preferred embodiment of machine according to the invention. As seen in FIG. 2 the machine comprises a base 10 having a central vertical shaft 11 extending upwardly therefrom. The shaft 11 carries a support table 12 and a cam plate 13, both fixedly connected to the shaft 11. Positioned between the table 12 and the cam plate 13 is a rotatable wheel 14 which is connected, by 36 equally spaced tie rods 15, to a feeding plate 16 positioned above the cam plate 13.

In order to drive the wheel 14 and feeder plate 16, the wheel is provided with a sprocket 17 which is driven by a chain 18 and a reduction gear 19, which in turn is driven by a motor (not shown) connected by a belt drive to pulley 20. The wheel 14 is caused to rotate in an anti-clockwise direction, as viewed in FIG. 1, and as indicated by the arrow.

Figure 1:
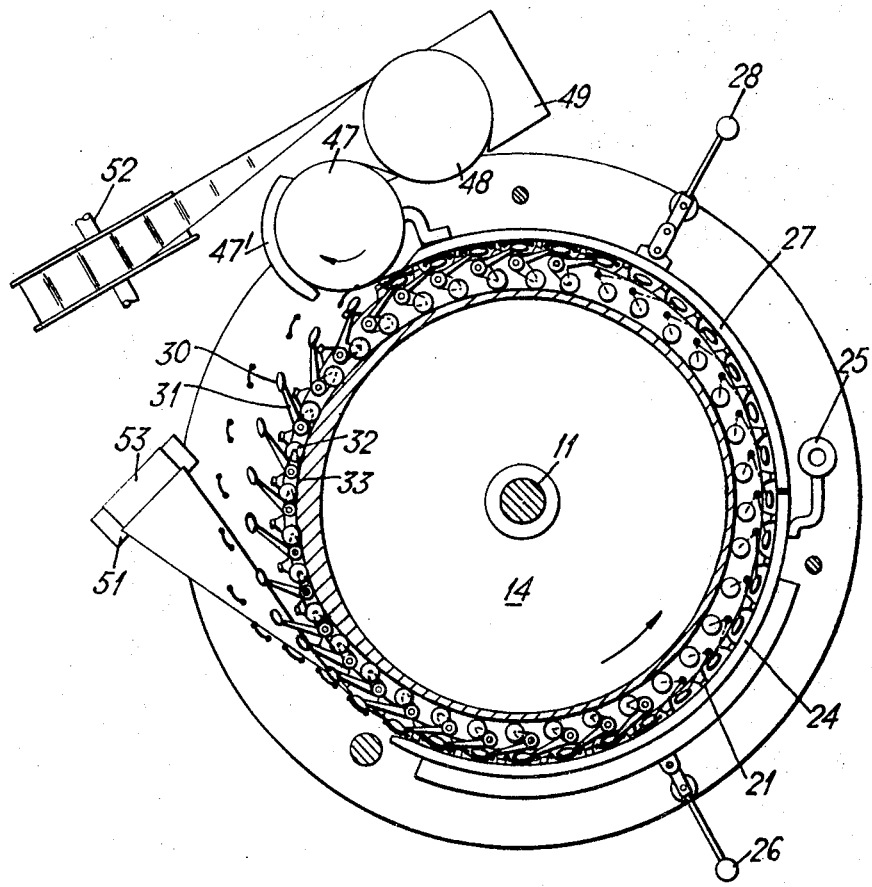
FIG. 1 is a top plan view, in section, of a preferred embodiment of apparatus according ot the invention.

Equally spaced around the periphery of the wheel 14 are 36 radially extending elements 21 (FIG. 1). These elements 21, which are illustrated in greater detail in FIGS. 5 and 6, each consist of an elongate pad 22 made of silicone rubber lined with polytetrafluoroethylene, and each is urged outwardly by a spring 23.

Positioned around 120° arc of the wheel 14 is a heated arcuate member 24 which is pivotally mounted on a support 25 and locked by a clamping arrangement 26. Similarly, a second non-heated or cooled arcuate member 27 is positioned to surround a further arc of 120° downstream of the member 24. The member 27 is mounted on a pivot (not shown) and is secured by a clamp 28.

Each of the tie rods 15 carries a funnel 29 having an elliptical cross-section stem 30. The funnels are each mounted on an arm 31, carried by one of the tie rods 15. The arm 31 forms one arm of a bell-crank lever, the other arm of which carries a roller 32, which bears against a cam surface 33, on the outer face of the cam plate 13.

As can be seen more clearly in FIG. 2, each funnel 29 is urged downwardly by a spring 34 surrounding the associated tie rod 15. The position of the funnel in the vertical sense is determined by a cam 35 engaging a portion of the arm of the bell-crank carrying roller 32.

On the outer surface of each funnel 29 there is pivoted, near the top of the funnel, a clamp 36 having an inwardly concave clamping plate 37 at the lower end. Plate 37 is urged downwardly by a spring 38, against the action of which a roller 39, running on a cam bar 40, secured to the table 12, forces the clamp 36 inwardly as the clamp plates 37 enter between the arcuate heated members 24 and the pockets formed by the elements 21.

In the modification illustrated in FIG. 3a, the clamp 36 has a second clamping plate 37', which is outwardly concave, in face-to-face relation to plate 37. Plate 37' is spring urged inwardly and can be forced out by a cam to clamp the radially inner portion of a web against the funnel stem 30.

In the plate 16, 36 holes 41 are arranged one immediately above each of the funnels 29. Around a portion of the periphery of the plate 16, on either side of the holes 41, grooves 42, 43 are formed on the upper surface of the plate.

Undereneath each of the holes 41 a radially outwardly sliding shutter 44 is arranged. Radial outward movement of this shutter is effected by a cam (not shown). A wall 45 surrounds a portion of the upper periphery of the plate 16, and a supply hopper 46 is arranged within this wall.

Referring to FIG. 1, there can be seen downstream of the member 27, a second roller 47 having, around a portion of the periphery thereof, an arcuate member 47'. Adjacent the roller 47 is a disc 48, around a portion of the periphery of which extends a heated member 49, having an inner surface conforming to the periphery of the disc 48.

A supply roll 50 is associated with the table 12 and supplies web material via the guide roller 51 and a web folding arrangement (not shown). Downstream of the member 49 a take-up spool 52 is located.

As an illustration of the method of the invention, the operation of the above described apparatus will be explained, by way of example, with reference to the formation of tea-bags. A web of heat-sealing resin impregnated paper is fed from roll 50 via the roller 51 and the folding device which is shown in FIGS. 3a and 3b. The folding device includes a U-cross-section channel section guide plate 80, carried by supports 81, a folder plate 82 being located within plate 80 to define a U-shaped opening or passage 83 for the web. The centre of the folder plate 82 lies on a tangent to the wheel 14 and the folding device serves to double the web into a channel and ensures that the web remains folded and is not deformed by the funnel stems 30 which are already in place as the fold is completed. In the course of this folding operation, as illustrated in FIG. 3 or FIG. 3a, the rotation of the wheel 14 carrying the funnels 29, causes the stems of the funnels 30 to be lowered within the V-form channel of the web 53. As the stems of the funnels 30 are lowered, by the action of the cam 35, the cam surface 33 permits them to move radially inwardly towards the wheel 14. At the same time as this occurs, the clamp plates 37 are lowered with the funnels 29, and are brought into contact with the outer wall of the V-form channel of the web by the cam 40. The clamp plates 37 progress radially inwardly until they are positioned in the pockets formed between adjacent elements 21. When they are in their fully retracted position, the clamps 37 hold the web of paper against the radially outer surface of the elliptical stems 30 of the funnels 29. Since the funnels are positioned radially inwardly of the pads 22 of the elements 21, these pads serve to wrap the inner wall of the V-form channel against the radially inner surface of the elliptical funnel stems.

If the double clamp plates, 37, 37' of FIG. 3a are employed, as indicated above, the centre of the former plate 82 lies on a tangent to the wheel, and the clamp plates 37' fold the web, while still on the tangent before entering the pockets formed between the projecting elements 24. The clamps are gradually closed leaving a clearance of about ⅛" (3.2 mm.) to allow additional length of the web to slide through to produce an inclined loop in the pockets. The outer clamp 37 is closed on the centre of the funnel stem 30 when entering between the projecting elements of the wheel.

As the wheel 14 rotates it takes with it the funnel stems 30 and the clamp plates 37 together with the paper web 53. The resiliently outwardly urged pads 22 press the paper web at spaced apart intervals against the inner surface of the heated arculate member 24. As this occurs, the heat-sealing resin in the paper causes sealing together of the two parts of the web between adjacent funnel stems 30.

If the wheel is caused to rotate, for example at 20 r.p.m., then, since the member 24 extends for 120° portion of the periphery of the wheel 14, the paper will be held by the pads 22 for approximately one second against the heated plate 24. This ensures a sufficient heating to provide a good heat-sealing between the two halves of the folded over web.

As each funnel enters between the wheel 14 and the member 24, the associated shutter 44 slides radially outwardly to permit a charge of tea to fall into the funnel 29. Scrapers (not shown) feed the tea over the holes 41 and also serve to scrape tea out of the grooves 42 and 43.

As the wheel progresses further, the funnels 29 are raised by the cam 37 and the stems steadily withdraw from the bottom of the V-form channel of the web 53. As this happens, tea in the stem 30 remains in the pocket formed by the elliptical steam as the stem is withdrawn. By the time the stem of the funnel has reached the downstream end of the cooling member 27, it is fully retracted from between the two halves of the web 53.

As the web progresses past the member 27, which may be forcibly cooled, the web itself is cooled and causes a setting of the resin material. Resin material exuding from the paper serves as a lubricant to facilitate movement of the web past the members 24 and 27.

The web entrained within the pockets of the wheel is of zig-zag form. The roller 47 is driven so that its peripheral speed is in excess of the peripheral speed of the wheel 14, so that the slack caused by the zig-zag form is removed. The stationary member 47' serves as a reaction member against which the roller 47 may act to cause the increase in linear speed of the web 53.

On leaving the roller 47, the web 53, which is still open at the top, passes around a disc 48 which is arranged to engage the open top of the web. The disc 48 serves to press the web against a heated member 49 to cause heat-sealing of this open edge. After leaving the disc 48 the web of completed tea-bags is wound up on a spool 52, or alternatively it may pass to an apparatus in which it may be cut up into individual tea-bags, and the bags themselves packaged.

Instead of removing the slack in the web by means of a roller 47, the slack may alternatively be removed by causing the pads 22, mounted on a suitable cam operated pivot, to move at an increased speed as compared with the wheel. In a further form, the roller 48 which provides the upper seam may itself be driven at an increased peripheral speed, as compared with the peripheral speed of the wheel 14, and be supplied via a loop in the web.

In FIG. 4 there is illustrated an alternative arrangement to the arrangement of clamp plates 37. At the point at which the wheel 14 enters the member 24 a conveyor 60 is positioned, the conveyor being synchronised with wheel 14 and being provided with outwardly extending protuberances 61 which force the web in between the pads 22. With this arrangement, the web is deformed by the protuberances 61. However, this arrangement has the disadvantage that the web on the radially outer surface of the funnels 30 is not protected from the action of the heated member 24.

It will be appreciated that the apparatus of the present invention can readily be used for purposes other than filling tea-bags and may be used for filling any suitable form of sachet, such as sachets commonly used in restaurants for containing sugar, or sachets containing liquid material, such as shampoo.

The apparatus is particularly suitable for feeding alongside the web 53, as it passes between the wheel 14 and the plate 21, a strip of aluminium about 1 cm. wide and less than 40 microns thick. This strip will become affixed to the string of bags leaving the machine and bags such as described and claimed in my U.S. Pat. No. 3,131,065 will be produced.

I claim:

1. A heat-sealing apparatus for heat-sealing together two portions of web material at spaced apart intervals, said apparatus comprising, in combination:
   a rotatable wheel;
   a periphery to said wheel;
   a plurality of projecting elements on said wheel, extending radially outwardly from the periphery thereof;
   an arcuate heating member positioned to extend around a portion of said periphery effective to overlie a plurality of said elements;
   an arcuate cooling member located adjacent said heating member, and positioned to extend around a second portion of said wheel adjacent and downstream of said portion thereof; and
   means for feeding a web of material between said elements and said arcuate member.

2. The apparatus as claimed in claim 1, wherein said means for feeding a web of material includes a folding device effective to fold said web so that it is longitudinally doubled upon itself to form a channel.

3. The apparatus defined in claim 2, wherein said folding device includes a U-cross-section channel shaped guide plate and a folder plate located within said guide plate effective to define a U-shaped opening for the passage of the web.

4. Heat-sealing apparatus for heat-sealing together two portions of web material at spaced apart intervals, said apparatus comprising, in combination:
   a rotatable wheel;
   a periphery to said wheel;
   a plurality of projecting elements on said wheel, extending radially outwardly from the periphery thereof, said periphery and projecting elements defining pockets;
   an arcuate heating member positioned to extend around a portion of said periphery effective to overlie a plurality of said elements;
   a set of funnels, one funnel for each of said pockets;
   a stem to each said funnel projecting into a pocket;
   support means effective to support said funnels for rotation with said wheel, the stem extending between the periphery of said wheel and said arcuate heating member; and
   means for feeding a web of material between said elements and said arcuate member.

5. The apparatus defined in claim 4, and further comprising an endless belt positioned immediately upstream of said arcuate heating member, and outwardly extending projections on said conveyor effective to force the radially outer portion of said web into contact with said funnel stems.

6. The apparatus defined in claim 4, and further comprising a set of clamps, one clamp for each funnel stem, clamp support means effective to support said clamps for rotation with said wheel and cam means to move said clamps effective to force said web against said funnel stem.

7. The apparatus defined in claim 4, and further comprising means to feed tea to each said funnel approximately at the upstream end of said arcuate heating member.

8. The apparatus defined in claim 4, wherein said support means for said funnels include means to lift said funnels steadily from the web, whereby said stems disengage from said web.

9. The apparatus defined in claim 2, and further comprising means to heat-seal the free edges of said doubled web, said heat-sealing means being located downstream of said arcuate heating member.

10. The apparatus as claimed in claim 4, wherein said means for feeding web material include a folding device effective to fold said web so that it is longitudinally doubled upon itself to form a channel.

11. The apparatus as claimed in claim 4, comprising an arcuate cooling member located adjacent said heating member, said arcuate cooling member being positioned to extend around a second portion of said wheel adjacent and downstream of said first portion.

References Cited

UNITED STATES PATENTS

| | | | |
|---|---|---|---|
| 2,546,059 | 3/1951 | Cloud | 53—180X |
| 2,624,164 | 1/1953 | Donofrio | 53—28 |
| 3,189,702 | 6/1965 | Wall et al. | 53—28X |
| 3,344,576 | 10/1967 | Cloud et al. | 53—28 |

TRAVIS S. McGEHEE, Primary Examiner